July 3, 1956    S. B. PICKLES    2,753,556
OMNIRANGE BEACON SYSTEM
Filed July 20, 1953

INVENTOR
SIDNEY B. PICKLES
BY
Ernest Fanwick
ATTORNEY

United States Patent Office 2,753,556
Patented July 3, 1956

2,753,556

OMNIRANGE BEACON SYSTEM

Sidney B. Pickles, Tarrytown, N. Y., assignor to International Telephone and Telegraph Corporation, a corporation of Maryland Application July 20, 1953, Serial No. 369,075

15 Claims. (Cl. 343—106)

This invention relates to omnirange beacon systems and more particularly to omnidirectional radio range systems of the phase comparison type.

Omnidirectional radio beacon systems provide means for an aircraft to determine its bearing to the beacon from any direction and so are more flexible than fixed course beacons. One type of omnidirectional beacon generally favored is the so-called phase comparison type. In these systems heretofore employed, a directive radio pattern is rotated at a given rate so that at a remote receiving point an amplitude variation is produced having a fundamental frequency component determined by the rate of rotation. The wave produced by this rotation may be referred to as the bearing envelope wave or bearing information wave. A reference signal wave is also transmitted as a modulation component of a frequency corresponding in frequency with the envelope wave. This reference signal wave, however, has a "fixed in phase" characteristic. The envelope wave has a phase relation with respect to the reference wave dependent upon the angular position of the remote receiving point with respect to the point of origin of the beacon radiation. The waves are so related that in a predetermined azimuth, for example north, the envelope wave and reference wave are cophasal. Thus the bearing of a craft with respect to the beacon can readily be obtained by making a phase comparison of these two waves.

In systems using the longer wavelengths electronic rotation of the bearing pattern is generally used because the structure is too large to rotate at a speed to provide a practical envelope frequency. At higher frequencies physical rotation is feasible. This is desirable as it avoids quadrantal and octantal errors which occur in electronic rotation systems.

In comparing a sine wave rotation frequency with a corresponding reference wave, the difference in phase varies by only one degree for one degree variation in azimuth giving low sensitivity and thus rendering the system subject to deviation errors from reflected energy in these portions. To remedy this, the antenna pattern is given harmonic frequency distortions. In the interests of radiation pattern efficiency, the principal antennas have heretofore been generally spaced to provide a minimum or complete absence of harmonic frequencies in the envelope wave, any desired harmonic distortion being provided by added circuits. Thus the pattern used has generally been of cardioid form having single minimum which was obtained by a plurality of fixed antennas. Accordingly in the past there has been considerable mutual coupling between the fixed antennas with the consequent development of undesired vertical polarized energy from normal horizontally polarized antennas. This fact tends to reduce sharpness of the courses defined by the beam.

One of the objects of this invention, therefore, is to provide an omnidirectional radio beacon of the phase comparison type which overcomes the aforementioned objections; and another object is to provide a receiver for use with such a beacon to indicate the direction to the beacon from the receiver.

Another object of this invention is to provide an omnidirectional radio range of improved design yielding coarse and fine azimuth indications.

According to a feature of this invention, an antenna system is provided for radiating and rotating a multilobe pattern wherein the lobes have a predetermined radial spacing and one of the lobes is of greater field strength than the others so that a receiver at a remote point may detect the radiation and produce an envelope wave having a fundamental component in accordance with the one lobe and a harmonic frequency in accordance with the total number of lobes. The antenna system may be arranged to provide for any desired harmonics or number of radiation lobes. Instead of making the fundamental lobe of greater field strength than the others, the reverse may be employed. The carrier frequency radiated is modulated with reference signals in synchronism with the rotation of each of the lobes through a given radial direction. At the receiver means are provided for detecting the carrier envelope wave and for detecting and separating the reference signals. Sine waves are generated at fundamental and harmonic frequencies in response to the detected reference signals, respectively. A phase comparator is provided for comparing the phase of the fundamental frequency component of the envelope wave with the fundamental frequency sine wave for coarse indication of direction, for comparing the phase of the harmonic frequency component of the envelope wave with the harmonic frequency sine wave for fine indication of direction. The two comparisons may be coupled through phase shifters on the basis of the ratio of the fundamental and harmonic frequencies, whereby any ambiguity in the comparison of the second or fine phase comparison is resolved by the first or coarse phase comparison.

The above-mentioned and other features and objects of this invention will become more apparent and the invention itself best understood by reference to the following description taken in conjunction with the accompanying drawings, in which.

Figure 1A:
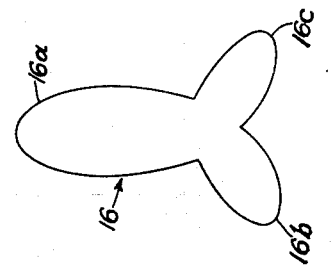
Fig. 1A is a top plan illustration of the antenna system of Fig. 1.
Figure 1B:
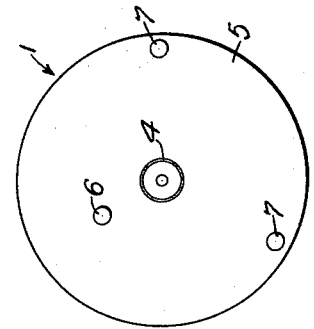
Fig. 1B is a graphic illustration of the radiation pattern of the antenna system of Fig. 1.
Figure 1:
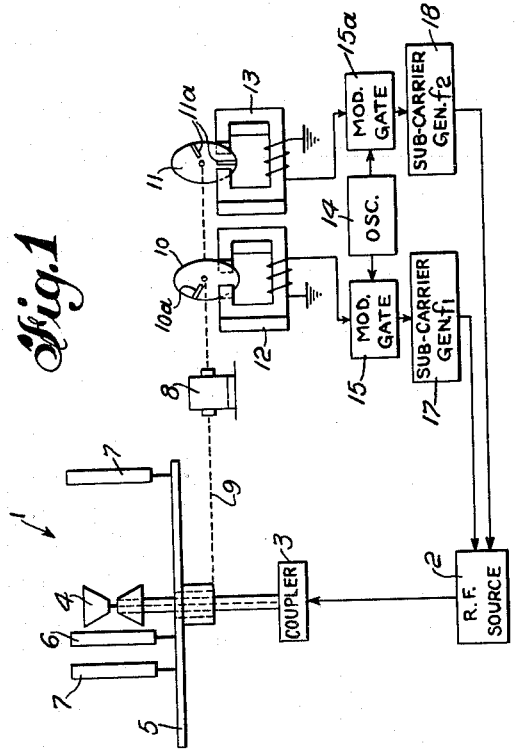
Fig. 1 is a diagram in block form illustrating a circuit arrangement of the transmitter of an omnirange beacon system in accordance with the principles of this invention.

Referring to Fig. 1 of the drawing, the transmitter of the omnirange beacon system shown therein comprises an antenna system 1 to which is supplied a typical carrier frequency, for example 1000 mc., from R.-F. source 2 through antenna coupler 3. The antenna system 1 includes a fixed omnidirectional antenna 4 which for purposes of this explanation is shown as a single unit, it being understood that a vertical stacked antenna array may be used to increase the vertical concentration of energy if desired. On a disc 5 mounted around antenna 4 are a plurality of reflectors as indicated at 6 and 7, Fig. 1A. The disc 5 is rotated at a desired speed, for example 30 revolutions per second by a motor 8 and mechanical linkage 9. Thus, while antenna 4 is supplied with energy, the rotating reflectors 6 and 7 distort the radiated pattern to produce a plurality of radiation lobes 16. Reflector 6 being closer to radiator 4 will produce a major radiation having a greater field strength as indicated by lobe 16a of Fig. 1B, while reflectors 7 will produce minor radiations as indicated by lobes 16b and 16c of Fig. 1B. If desired, reflector 6 may be spaced on the periphery of disc 5 the same as reflectors 7 but in that case with a greater width than reflectors 7 in order to produce a major radiation. Thus at a remote point the received radiations will vary with a fundamental frequency dependent upon the rotation of the major lobe 16a and with a harmonic frequency dependent upon the rotation of all the lobes 16a, 16b, and 16c. A greater number of reflectors or other reflector and feeder arrangements may be utilized if the radiation of a greater number of lobes is desired. The harmonic order received at a remote point is dependent upon the number of lobes in the radiation pattern.

The motor 8 also drives two discs 10 and 11 composed of a non-magnetic material in synchronism with the disc 5 to provide pulses for furnishing fundamental and harmonic reference signals. With each disc 10 and 11 are provided magnetic pickup units 12 and 13, respectively, which serve to provide pulses each time iron slugs 10a and 11a carried by the rotating discs 10 and 11 pass the pickup units 12 and 13, respectively. The iron slugs are so located in the peripheral portion of discs 10 and 11 that they pass the pickup units 12 and 13 each time the corresponding radiation lobe passes through a predetermined direction. Output energy from the magnetic pickup device 12 synchronizes operation of a modulator gate 15 for bursts of oscillations from oscillator 14, to frequency modulate the sub-carrier frequency $f_1$ of sub-carrier generator 17. The modulated sub-carrier is applied to modulate the R.-F. carrier source 2. Pickup unit 13 likewise serves to synchronize operation of a modulator gate 15a for bursts of oscillations from oscillator 14 to frequency modulate the sub-carrier $f_2$ of sub-carrier generator 18. This modulated sub-carrier is also applied to modulate the R.-F. carrier source 2. Thus each time a radiation lobe is passed through a predetermined direction, reference frequency energy is impressed on the transmission carrier frequency and transmitted to all receivers regardless of location. The radiation from antenna system 1 at any given receiving point comprises an R.-F. carrier amplitude modulated at a fundamental and harmonic rate and sub-carrier frequencies modulated with the fundamental and harmonic reference signals.

Figure 2:
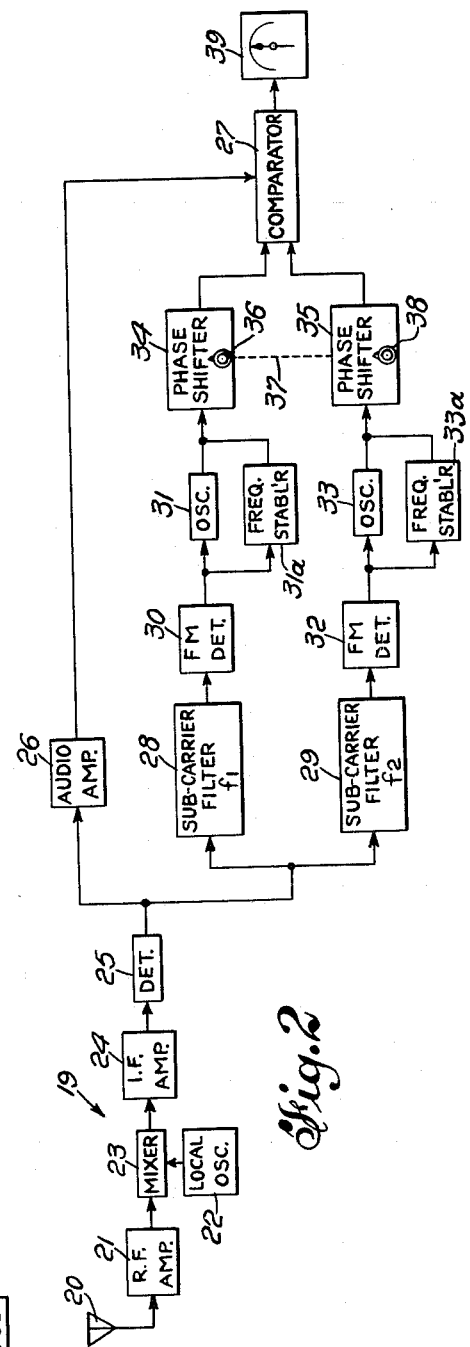
Fig. 2 is a schematic block diagram of a receiver for use with the transmitter of Fig. 1.

The receiver 19 shown in Fig. 2, provided in an aircraft, preferably includes a non-directive receiving antenna 20 and the usual frequency converter circuit comprising an R.-F. amplifier 21, a local oscillator 22, and a mixer 23 which feeds into an intermediate frequency amplifier 24. The output of the I.-F. amplifier is coupled to a detector 25 which separates the carrier and sub-carrier frequencies.

The output of I.-F. amplifier 24 is fed through detector 25 to audio amplifier 26. The output of audio amplifier 26 includes the bearing envelope wave having a fundamental and harmonic frequency component, derived from the amplitude modulation of the radiated R.-F. signal by the rotation of reflectors 6 and 7, and is coupled to the phase comparator 27. The components of the bearing envelope wave have phases dependent upon the angular position of the receiver with respect to the transmitter.

In order to obtain the reference signals to compare with the fundamental and harmonic components of the bearing envelope wave, the output of the I.-F. amplifier 24 is fed through detector 25 to filters 28 and 29. Filter 28 passes only the signals of the fundamental sub-carrier frequency, for example 50 kc. The filtered fundamental sub-carrier signal output from filter 28 is fed to FM detector 30 circuit. The output of the FM detector 30 comprises pulses having a repetition rate equal to the fundamental frequency and are representative of the position of reflector 6 of antenna system 1 every time the metallic slug passes the magnetic pickup unit 12. The fundamental frequency reference pulses from FM detector 30 synchronize an oscillator 31 in conjunction with frequency stabilizer 31a which produces a sine wave at the fundamental frequency.

Filter 29 eliminates from the output of the detector 25 all but the R.-F. signal at the harmonic sub-carrier frequency. The harmonic sub-carrier signal is fed to FM detector circuit 32. The output of the FM detector circuit 32 comprises pulses having a repetition rate equal to the harmonic frequency and are representative of the position of a reflector 6 or 7 of antenna system 1 every time a metallic slug 11a passes magnetic pickup unit 13. These harmonic frequency reference pulses from FM detector 32 are utilized to synchronize the sine wave oscillator 33 and frequency stabilizer 33a so that the output of oscillator 33 is a sine wave at the harmonic frequency.

The fundamental frequency sine wave output of oscillator 31 is coupled through phase shifter 34 to the comparison circuit 27 where it is compared to the fundamental frequency component of the bearing envelope wave from the output of the audio amplifier 26. The adjustment of phase shifter 34 necessary to bring the fundamental component of the bearing signals and fundamental frequency reference wave from oscillator 31 to a coincident relation indicates the azimuth of the transmitter from the receiver, provided the dial 36 of the phase shifter is properly calibrated. The harmonic frequency sine wave output of oscillator 33 is coupled through phase shifter 35 to comparison circuit 27 where it is compared to the harmonic frequency component of the bearing envelope wave from the output of the audio amplifier 26. For any one position of the receiver in relation to the transmitter, there will be as many points of coincidence between the harmonic reference sine wave and harmonic component of the bearing signal as the order of harmonic being transmitted, i. e. for the third harmonic there will be three positions of phase shifter 35 where the harmonic reference sine wave and harmonic component of the bearing signal are coincident. The bearing indication derived from the comparison at the fundamental frequency is necessary to resolve this harmonic ambiguity. The bearing indication derived from the harmonic signals has greater sensitivity and is thus more accurate than the fundamental frequency bearing indication. Phase shifter 34 may be coupled to phase shifter 35 by the mechanical linkage and gears of coupler 37 in such a manner that phase shifter 35 will be rotated three complete revolutions for each revolution of phase shifter 34. Thus the harmonic ambiguity is automatically resolved, and the reading of the dials 36 and 38 of phase shifters 34 and 35 which indicate coincidence of the bearing and reference signals will be the true azimuth of the receiver to the transmitter. In addition, meter 39 is coupled to the comparator circuit 27 to indicate when the phase of the compared signals deviates from the setting of phase shifters 34 and 35.

Reference may be had to my copending joint application, Serial No. 280,404, filed April 3, 1952, entitled "Omnirange Beacon System," assigned to the same assignee as this application, for another type of receiver that may be used to cooperate with the beacon disclosed in this application.

While I have described above the principles of my invention in connection with specific apparatus, it is to be clearly understood that this description is made only by way of example and not as a limitation to the scope of my invention as set forth in the objects thereof and in the accompanying claims.

I claim:

1. A beacon comprising radiation means for radiating a multilobe pattern wherein the lobes have a predetermined angular spacing, means to rotate said radiation pattern at a given rate, one of said lobes having greater radiation than the others whereby detection at a remote point produces a signal having a fundamental frequency in response to said one lobe and a signal having a frequency harmonically related to said fundamental frequency in response to all said lobes, means for applying energy of a radio frequency carrier to said radiation means, and means to modulate said carrier frequency with reference signals in synchronism with the rotation of each of said lobes through a given radial direction.

2. A beacon according to claim 1, wherein the means for modulating said carrier includes means for distinguishing the reference signals with respect to said one lobe and the other lobes.

3. A beacon according to claim 2, wherein said means for distinguishing the signals includes a source of a first sub-carrier frequency, means for modulating said first sub-carrier frequency with reference signals synchronized with said one lobe, a source of a second sub-carrier frequency, means for modulating said second sub-carrier frequency with reference signals synchronized with the other of said lobes, and means for modulating said radio frequency carrier energy with said first and second modulated sub-carrier frequencies.

4. A beacon according to claim 3, wherein said means for modulating said first and second sub-carrier frequencies with reference signals includes a first magnet means, means to pass a magnetizable substance past said first magnet means in synchronism with the rotation of said one lobe of said radiation pattern to change the reluctance of said magnet means, means responsive to a change in reluctance of said first magnetic means to produce a first pulse signal, means to modulate said first sub-carrier frequency with said first pulse signal, a second magnet means, means to pass magnetizable substances past said second magnet means in synchronism with the rotation of the other of said radiation pattern lobes to produce changes in the reluctance of said second magnetic means, means responsive to a change in reluctance of said second magnetic means to produce a second pulse signal, and means to modulate said second sub-carrier frequency with said second pulse signal.

5. A beacon according to claim 1, wherein said radiator means for radiating a multilobe pattern includes a radiator and a plurality of reflectors spaced about said radiator, one of said reflectors being characterized different from the others to produce a different radiation effect, and means to produce effective rotation of said spaced reflectors about said radiator.

6. A beacon according to claim 5, wherein said means to modulate said carrier frequency includes a pair of sub-carrier frequency sources, a source of reference signals synchronized with the rotation of said reflectors through a given radial direction relative to said radiator, means to modulate one of said sub-carrier frequencies according to a reference signal corresponding to said differently characterized reflector, means to modulate the other of said sub-carrier frequencies with the other of said reference signals, and means to modulate said radio frequency carrier with said sub-carrier frequencies.

7. A radio beacon system comprising an antenna system including a radiator and a plurality of reflectors spaced about said radiator, one of said reflectors being characterized different from the others to produce a different radiation effect, means to produce effective rotation of said spaced reflectors about said radiator whereby received radiations at a remote point with respect to said antenna system will vary with a fundamental frequency and a given harmonic frequency dependent upon the rotation speed, means synchronized with rotation of said reflectors for producing reference signals at said fundamental and harmonic frequencies, a source of radio frequency energy, means to modulate said radio frequency energy with said reference signals, and means for applying said modulated radio frequency energy to said radiator.

8. A radio beacon system comprising an antenna system having a radiator and a plurality of reflectors spaced thereabout, means to rotate said reflectors about said radiator to produce a rotating radiation multilobe pattern corresponding to the number and spacing of said reflectors, one of said reflectors being characterized to provide a radiation lobe distinguished from the lobes produced from the other reflectors whereby reception at a remote point detects a fundamental frequency and a harmonic thereof according to the rotation of said radiation pattern, a source of radio frequency carrier energy, sources of two different sub-carrier frequencies, a source of reference signals synchronized with the rotation of said reflectors through a given radial position relative to said radiator, means to modulate one of said sub-carrier frequencies according to a reference signal corresponding to said one reflector and means to modulate the other of said sub-carrier frequencies according to reference signals corresponding to the other of said reflectors, means to modulate said radio frequency carrier with the modulated sub-carrier frequencies, and means to apply said modulated radio frequency carrier to said radiator.

9. In a direction finding system a beacon comprising radiator means for radiating a multilobe pattern wherein the lobes have a predetermined angular spacing, means to rotate said radiation pattern at a given rate, one of said lobes having greater radiation than the others whereby detection at a remote point produces a fundamental wave in response to said one lobe and a harmonic wave in response to all said lobes, means for applying energy of a radio frequency carrier to said radiator and means to modulate said carrier frequency with reference signals in synchronism with the rotation of each of said lobes through a given radial direction, a receiver at a remote point for receiving the signal radiations of said beacon, means for detecting the carrier envelope wave and said reference signals, a phase comparator for comparing the phase of said fundamental wave with the timing of said reference signals for coarse indication of direction and for comparing the phase of said harmonic wave with the timing of said reference signals for fine indication of direction.

10. A system according to claim 9, wherein said means for modulating said carrier frequency includes a first source of sub-carrier energy, means for modulating said first sub-carrier energy with reference signals with respect to said one lobe, a second source of sub-carrier energy, means for modulating said second sub-carrier energy with reference signals with respect to said lobes, and means for modulating said radio frequency carrier energy with said first and second modulated sub-carrier energy.

11. A system according to claim 9, wherein said means for modulating said carrier frequency includes a pair of sub-carrier energy sources of different frequencies, means for modulating one of said sub-carrier energies with reference signals with respect to said one lobe, means for modulating other of said sub-carrier energies with reference signals with respect to said lobes and means for modulating said radio frequency carrier energy with said modulated sub-carrier energies and wherein said means for detecting said reference signals includes means to separate said sub-carrier energies of different frequencies and means to demodulate each of said separated sub-carrier energies.

12. A direction finding system comprising a beacon including an antenna system, a radiator and a plurality of spaced reflectors about said radiator, means to produce effective rotation of said spaced reflectors about said radiator whereby the received radiations at a remote point with respect to said antenna system will have a fundamental frequency dependent upon said rotation speed, said reflectors being spaced to produce a multilobe radiation pattern so that said received radiations have a plurality of sub-carrier energy sources, a source of reference frequency energy synchronized to the rotation of one of said reflectors through a given radial direction for modulating one of said sub-carriers with pulses of a reference frequency corresponding to said fundamental frequency and a second source of reference frequency energy synchronized to the rotation of all of said reflectors through said given radial direction for modulating a second sub-carrier with pulses of reference frequency at said harmonic frequency, a source of radio frequency energy, means to modulate said radio frequency energy with both modulated sub-carriers and means for applying said modulated radio frequency energy to said radiator, and means for indicating the direction from a receiving point to said beacon by means of received energy from said beacon including a receiver, means to detect the bearing envelope wave of the radio frequency carrier and said reference pulses, means to separate said reference pulses in accordance with the sub-carrier frequencies, first oscillator means to produce a sine wave at said fundamental frequency in response to said separated fundamental frequency reference pulses, second oscillator means to produce a sine wave at said harmonic frequency in response to said separated harmonic frequency reference pulses, and means to compare the phase of the fundamental frequency component of said bearing envelop wave with said sine wave at said fundamental frequency for coarse indication of direction and the phase of the harmonic frequency component of the said bearing envelope wave with said sine wave at said harmonic frequency for fine indication of direction.

13. A direction indicating receiver for indicating the direction line from a receiving point to a beacon by means of carrier signals received from said beacon, said carrier signals comprising a bearing envelope wave of a signal determined by the position of the receiver with respect to the beacon composed of fundamental and harmonic frequency components and sub-carrier energy modulated by reference signals, comprising means for receiving said carrier signals, means to separate said bearing envelope wave and said reference signals, first oscillator means to produce in response to said separated fundamental frequency reference signals a sine wave at said fundamental frequency, second oscillator means to produce in response to said separated harmonic frequency reference signals a sine wave at said harmonic frequency, and means to compare the phase of the fundamental frequency component of said bearing envelope wave with said sine wave at said fundamental frequency for coarse indication and the phase of the harmonic frequency component of the said bearing envelope wave with said sine wave at said harmonic frequency for fine indication.

14. A direction indicating receiver according to claim 13, which further includes a first phase shifter to shift the phase of said fundamental frequency sine wave and a second phase shifter to shift the phase of said harmonic frequency sine wave.

15. A direction indicating receiver according to claim 14, further including means for coupling said first and second phase shifters on the basis of the ratio of said fundamental and harmonic frequencies whereby any ambiguity in the comparison of said harmonic frequency sine wave and harmonic component of said bearing envelope wave is resolved by comparing said fundamental frequency sine wave and said fundamental component of the bearing envelope wave.

References Cited in the file of this patent

UNITED STATES PATENTS

| | | |
|---|---|---|
| 2,377,902 | Relson | June 12, 1945 |
| 2,564,703 | Litchford et al. | Aug. 21, 1951 |
| 2,565,506 | Litchford | Aug. 28, 1951 |
| 2,572,041 | Litchford et al. | Oct. 23, 1951 |